United States Patent

Hyer

[15] 3,662,276

[45] May 9, 1972

[54] BUMPLESS TRANSFER CIRCUITS FOR PROCESS CONTROL SYSTEMS

[72] Inventor: Donald Roy Hyer, Lynnfield, Mass.
[73] Assignee: General Electric Company
[22] Filed: Oct. 2, 1970
[21] Appl. No.: 77,563

[52] U.S. Cl. .................................330/1 A, 318/591, 328/1, 328/71, 330/51, 330/85
[51] Int. Cl. .................................................H03f 1/32
[58] Field of Search.....................330/51, 1 A, 85; 328/1, 71; 318/591, 615, 681

[56] References Cited

UNITED STATES PATENTS 3,422,457  1/1969  Koppel ..................................318/591

Primary Examiner—Roy Lake
Assistant Examiner—James B. Mullins
Attorney—William S. Wolfe, Frank L. Neuhauser, Oscar B. Waddell and Joseph B. Forman

[57] ABSTRACT

A process control system including automatic and manual control subsystems which alternatively regulate current supplied to a control element. The system includes means for providing bumpless transfer from one subsystem to the other. Memory capacitors in feedback paths to the subsystems store charges proportional to the voltage across the control element. The stored charges provide feedback bias to each amplifier in the subsystem to which control is being transferred.

7 Claims, 2 Drawing Figures

INVENTOR:
DONALD R. HYER,

BY Gerald R Woods
HIS ATTORNEY.

BUMPLESS TRANSFER CIRCUITS FOR PROCESS CONTROL SYSTEMS

BACKGROUND OF THE INVENTION

The present invention pertains to process control systems and more particularly to means for providing bumpless transfer between automatic and manual modes of process control.

In a closed loop process control system, a number of process variables are monitored by transducers each of which generates an electrical signal having a magnitude representative of the existing value of a particular process variable. Each transducer signal is applied to a process controller along with a setpoint signal representing either an optimum or a limiting value for the process variable, depending on the specific application. For the purposes of description, it should be assumed that the setpoint signal represents a limiting value instead of an optimum value. If a comparison between the transducer signal, hereafter referred to as the process variable signal, and the setpoint signal shows the process variable is exceeding the setpoint, the controller transmits a control signal to a control element for the process variable. The control element alters the operating condition of a variable-controlling device such as a valve to drive the variable within the permissible range of values bounded by the setpoint. Control of a process variable through a closed loop including a transducer, a process controller and a control element is referred to as automatic control.

For some applications, it may be desirable to supplement automatic control circuits with manual control circuits in which an adjustable voltage source provides a controlling current for the control element. Manual control circuits are made part of normally automatically operated systems for several reasons. Manual control circuits assure that a failure in the transducer or process controller sections of a closed loop will not result in major disruptions of the process being controlled. Also, manual control circuits permit an experienced operator to control the process during startup, while "tuning" the process or while temporarily changing the level of operation of the process.

Where a process control system includes both an automatic control subsystem and a manual control subsystem, problems can arise when control of a process variable is transferred from the controlling subsystem to the idle or non-controlling subsystem. Unless the output of the idle subsystem and the controlling subsystem are approximately the same during the transfer, a sudden current transition or current bump will occur in the current supplied to the control element. This bump or rapid change may temporarily disrupt the process with consequent loss of product quality or production time.

Attempts have been made to provide bumpless transfer by including a manual balance position between automatic and manual positions of a mode control switch. With the switch in the manual balance position, the output of the manual control subsystem is manually adjusted to equal the existing output of the automatic control subsystem. Control is transferred only after the outputs are equalized. Other attempts have been made to accomplish bumpless transfer by including amplifiers which are continually controlled by electromechanical servo systems to produce outputs which track the output of the circuit in control. The manual balance procedure is not fully satisfactory since it is time-consuming and only as accurate as the operator performing the balance procedure. The continuous servo system circuits are not fully satisfactory either since they tend to be bulky and costly.

Moreover, in some systems, a plurality of controllers, each responsive to a different process variable, are used to control a single control element which influences each of the process variables. The controller inputs are scaled so that the most extreme controller output actually drives the control element during the automatic mode of operation. Since systems such as this include a plurality of amplifiers, any one of which may provide a controlling current at any time depending on the condition of its input, the disadvantages of the manual balancing procedures or of the servo system balancing arrangement are greatly multiplied.

SUMMARY OF THE INVENTION

The present invention overcomes these and other disadvantages of the prior art systems. A system incorporating the present invention is capable of transferring between automatic and manual modes of operation without generating any significant current bumps during transfer. The system includes an automatic control subsystem with one or more process controllers, each of which has inputs representing a particular process variable and a particular setpoint for that variable, an output, and a negative feedback path including a series-connected capacitor. The system also includes a manual control subsystem including an adjustable voltage source which drives a manual control amplifier. During automatic operation switching means connects one of the process controllers to a control element. During manual operation, the switching means connects the manual control amplifier to the control element. A system feedback path includes a first branch which connects the control element to the feedback paths of the one or more controllers and a second branch which connects the element to the manual control amplifier. The second branch includes a series-connected capacitor. When the system is operating in the automatic mode, the capacitor in the second branch is charged to the voltage appearing across the control element. When the system is operating in the manual mode, each of the capacitors in the feedback paths of the one or more controllers is charged to the voltage across the control element. Upon transfer of control from one subsystem to the other, the charged capacitors assure that the output of the selected subsystem is approximately the same as the voltage appearing across the control element just prior to the transfer.

DESCRIPTION OF THE DRAWINGS

While the specification concludes with claims particularly pointing out and distinctly claiming that which is regarded as the present invention, details of a preferred embodiment of the invention along with further objects and advantages may be more readily ascertained from the following detailed description when read in conjunction with the accompanying drawings in which:

DETAILED DESCRIPTION

System Block Diagram

Figure 1:
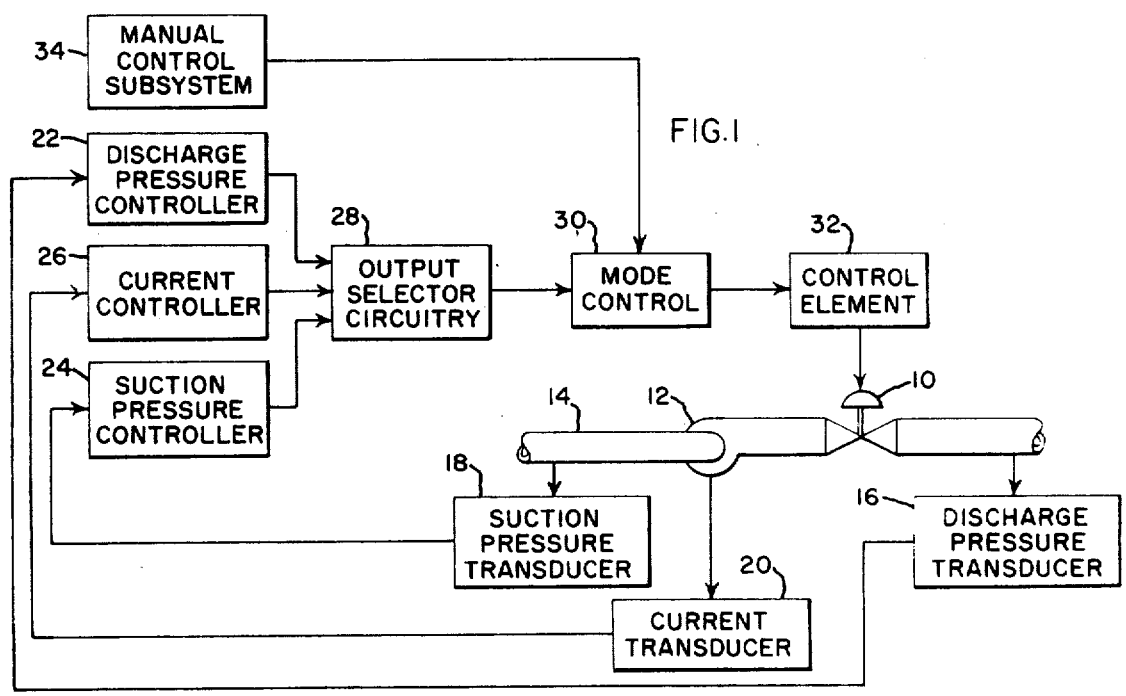
FIG. 1 is a block diagram of a closed loop process control system into which the present invention may be incorporated.

FIG. 1 shows a typical application for a process control system including a multiple-controller automatic control subsystem and a manual control subsystem for alternatively regulating the current supplied to a single control element. In that figure, the device being controlled is a valve 10 located on the discharge side of a booster pump 12 in a fluid pipeline 14. The downstream or discharge pressure in the pipeline 14 is monitored by a discharge pressure transducer 16 whereas the upstream or suction pressure is monitored by a similarly constructed suction pressure transducer 18. The load current in the pump motor is monitored by a current transducer 20. The transducers 16, 18 and 20 generate electrical signals which are applied to corresponding process controllers 22, 24 and 26. Under normal operating conditions, the output of the discharge pressure controller 22 is passed through output selector circuitry 28 to a mode control or switching means 30 which determines whether a control element 32 is to respond to the output of one of the controllers 22, 24 and 26 or to the output of a manual control subsystem 34 also connected to the mode control 30.

To illustrate a typical application for a multiple-controller closed loop process control system, it is assumed that the control element 32 is under the control of an automatic control subsystem consisting of: transducers 18, 20, 22; controllers 22, 24, 26; and output selector circuitry 28. As was indicated before, during normal operation the discharge pressure in the pipeline 14 is monitored to control the position of the valve 10. If the pipeline 14 becomes blocked upstream of pump 10, an abnormal drop in the suction pressure causes a similar drop in the discharge pressure. The discharge-pressure controller, if acting alone, would attempt to remedy the pressure drop by opening the valve 10 to bring the discharge pressure up to a setpoint. Opening the valve 10 would result in a further drop in suction pressure. Eventually, the suction pressure would reach subnormal levels at which booster pump 12 would vapor-lock and burn out. Another undesirable condition may occur in the pipeline where the suction pressure is high but the discharge pressure is low. This combination of pressures leads to high motor currents which can eventually destroy the pump motor.

To safely control the operation of the pipeline, a selector control system is used in which discharge pressure and motor currents are held to high limits and suction pressure is held to a low limit. Normally, a direct-acting valve is used in this type of application so that it will close on loss of signal. Consequently, reverse-acting controllers are required in the discharge pressure and motor current controller loops so that valve 10 will tend to close if the discharge pressure or the motor current exceeds a predetermined limit. With suction pressure being held to a low limit, the control action must be such as to close the valve if the suction pressure falls below that limit. This requires the use of a direct-acting controller.

In the system as described, the output selector circuitry passes the lowest of the controller signals which allows the discharge-pressure controller 22 to operate the valve 10 during normal operating conditions. However, if the suction pressure drops below a limit, its signal becomes the lowest and the controller 24 assumes control of the valve 10 through control element 32. Similarly, if the motor current exceeds its setpoint, the current controller 26 will have the lowest output signal of the three controllers and will act to control the valve 10 through the control element 32.

For a number of reasons, an operator may wish to remove the control of the valve 10 from the closed loop and assume control of the valve position himself. To do this, he uses mode control 30 to disconnect the output selector circuitry 28 from the control element 32 while connecting the manual control subsystem 34 to control element 32. By adjusting the current provided by the manual control subsystem 34, the operator controls the current provided to control element 32 and thus the position of the valve 10.

During the transfer of control from the automatic control subsystem to the manual control subsystem (or from manual to automatic) the different levels of outputs of the two subsystems can cause bumps in the current supplied to the control element 32. These bumps may cause the valve 10 to "hunt" for a new position, disturbing the fluid flow in the pipeline 14 or the process to which the pipeline is connected. The purpose of the present invention is to eliminate the current bumps during the transfer of control from one subsystem to the other.

Circuit Description

Figure 2:
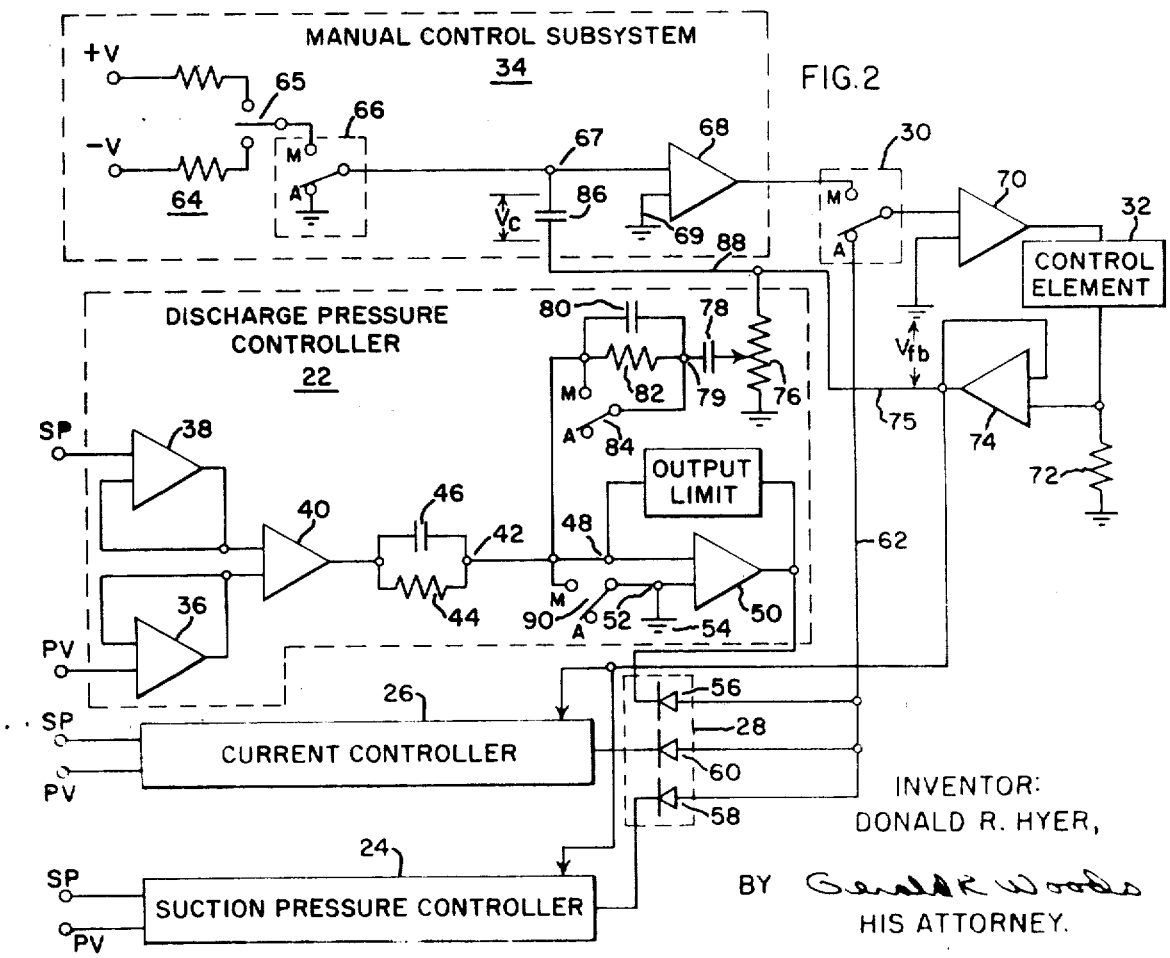
FIG. 2 is a schematic diagram of certain portions of the closed loop process control system, showing the present invention in detail.

Referring to FIG. 2, there are more detailed schematic diagrams of certain of the elements shown only in block diagram form in FIG. 1. At the same time, the elements in the closed loop system which are not essential to an explanation of the present invention have been omitted from FIG. 2. The discharge pressure controller 22 is shown in greater detail whereas the current controller 26 and the suction pressure controller 24 are shown only in block diagram form. The controllers 24 and 26 are similar to the controller 22 except that the suction pressure controller 24 is direct-acting rather than reverse-acting like controllers 26 and 22. The changes in controller connections which are needed to make a controller direct-acting rather than reverse-acting are known to those skilled in the art and it is deemed unnecessary to illustrate those connections. In the following discussion, reference is made to components in controller 22. Since controllers 22, 24, 26 are connected in parallel, it should be understood that any such reference applies to equivalent components in each of the other controllers.

In the discharge pressure controller 22, a signal representative of the discharge pressure is applied at one input PV to a high impedance amplifier 36. A second electrical signal representing a setpoint or high limit for the discharge pressure is applied to an input terminal SP of a second high input impedance amplifier 38. The deviation between the process variable and the setpoint is determined by combining the outputs of the amplifiers 36 and 38 in a differential error amplifier 40. The output of amplifier 40 is applied to a circuit 42 consisting of the parallel combination of resistor 44 and capacitor 46. The output of the circuit 42 is applied to a first input 48 of controller amplifier 50. A second input 52 to the controller amplifier 50 is connected to a COMMON terminal 54 and to the output of circuit 42 through a relay-controlled switch 90. The triangular symbol representing the COMMON terminal is used throughout FIG. 2 to indicate that each of the designated points is tied electrically to the same terminal. The output of the controller amplifier 50, like outputs of corresponding controller amplifiers (not shown) in controllers 24 and 26, are applied to the cathodes of diodes 56, 58, 60 which have a common anode connection. The diodes 56, 58, 60 constitute output selector circuitry 28. The lowest of the signals provided at the output of the controller amplifiers forward biases one of the three diodes while back biasing the other two. The lowest signal is passed through the forward biased diode on a lead 62 connecting the output selector circuitry 28 to a first switching means or mode control 30, shown as a simple switch.

A second input to the mode control 30 is provided by the manual control subsystem 34 consisting of a voltage source 64 having a movable contact 65 and a pair of positive and negative voltage sources. The movable contact 65 is normally biased to a central, open-circuiting position but may be held in an upper or lower position by an operator to complete an electrical connection between contact 65 and the positive or the negative voltage source, respectively. The contact 65 in the voltage source 64 is connected to a switching means 66, hereafter referred to as second switching means to distinguish it from the first switching means in the mode control 30. When the system is operating in the automatic mode, the voltage source is open circuited and the movable contact in the second switching means 66 is connected to COMMON. When the system is operating in the manual mode, the current supplied by the voltage source 64 is applied through the second switching means 66 to a first input 67 to a manual control amplifier 68 having its output connected to the mode control 30. A second input 69 to amplifier 68 is connected to COMMON. The mode control 30 is connected to a current amplifier 70 which supplies current to the control element 32. A feedback resistor 72 is connected in series with control element 32 between current amplifier 70 and COMMON.

A system feedback path including a high input impedance amplifier 74 connected to the upper end of feedback resistor 72 provides a feedback current to two branches. The first branch 75 includes negative feedback paths to each of the controllers 22, 24, 26. Referring to controller 22, the current is supplied through an adjustable resistor or potentiometer 76 to a series-connected capacitor 78 in the controller feedback path. The controller feedback path may include a rate circuit 79 consisting of a parallel combination of a capacitor 80 and a resistor 82 connected across a relay-controlled switch 84. The feedback paths for controllers 24 and 26 are similar.

The system feedback current is also applied to a series-connected capacitor 86 in a second branch 88 of the system feedback path. The upper end of the capacitor 86 is connected to the first input 67 to the subsystem amplifier 68 and to the movable contact of the second switching means 66. An additional output limiting feedback circuit 51 is connected across amplifier 50 in controller 22 to prevent the amplifier 22 from saturating when controller 22 is idle. Similar limiting circuits are connected across corresponding amplifiers in controllers 24 and 26. Since such limiting circuits are widely known in the art, their construction and mode of operation are not described.

Automatic to Manual Transfer

The circuit described above operates in the following manner to provide substantially bumpless transfer from the automatic mode to the manual mode of operation. While the system is still in the automatic mode, current supplied to control element 32 is regulated by one of the controllers 22, 24, 26, each of which is biased by a negative feedback current supplied by the first branch 75 of the system feedback path. A feedback current in the second branch 88 charges capacitor 86 to a voltage $V_c$. During the automatic mode, the upper plate of capacitor 86 and both inputs to amplifier 68 are connected to COMMON, making the voltage $V_c$ equal to the feedback voltage $V_{fb}$ at the output of the high impedance amplifier 74 in the system feedback path.

At the time of transfer, the movable contacts in mode control 30 and switching means 66 are moved to the M or manual position to connect the output of amplifier 68 to current amplifier 70 and the first input 67 of amplifier 68 to the voltage source 64. Unless, however, the movable contact 65 in source 64 is being held in contact with the terminal of either the positive voltage source or the negative voltage source, an open circuit exists at movable contact 65. As a result, the voltage $V_c$ is applied directly to the first input 67 of amplifier 68. Before transfer voltage $V_c$ is the same as feedback voltage $V_{fb}$, and a very small error voltage is required at the input of amplifier 68 to apply a "manual" signal to current amplifier 70 after transfer substantially equal to the "automatic" signal previously applied by the active one of controllers 22, 24, 26. A very small change in the output of amplifier 70 provides the error voltage required at amplifier 68. Since the pre-transfer and post-transfer outputs of current amplifier 70 are substantially equal, the transfer from the automatic mode to the manual mode is bumpless.

The preceding description indicates that the voltage applied to the first input of amplifier 70 following transfer is considered to be substantially but not necessarily identically equal to voltage before transfer. Where the two voltages are unequal, due to the error voltage required at the input to amplifier 68, the pre-transfer and post-transfer inputs to amplifier 70 will differ. The voltage at the first input 67 to amplifier 68 will be driven to the required level by means of normal feedback action. The change in output of power amplifier 70 which is required to provide the error voltage at the input to amplifier 68 is negligible in comparison to the total output of power amplifier 70 because of the high gain and low offset voltage of amplifier 68. Therefore, the transfer is effectively, if not ideally, bumpless.

After the transfer is complete, an operator can control the current applied to amplifier 68 by holding movable contact 65 against the terminal for either of the voltage sources in source 64. The current supplied by the source 64 charges or discharges capacitor 86 in a ramp manner to the desired voltage.

Manual to Automatic Transfer

While the system is operating in the manual mode, the rate circuit 79 in the feedback loop for controller 22 is short circuited by switch 84. Both inputs to the controller amplifier 50 and the left plate of the feedback capacitor 78 are connected to COMMON through switch 90. The feedback capacitor 78 charges to a voltage determined by the current through feedback resistor 72.

When the system is to return to an automatic mode of operation, the movable contacts in switches 30, 66, 84 and 90 are thrown to the A position. The capacitor 86 is connected to COMMON while the input of current amplifier 70 is reconnected to the output of the selector circuitry 28. The opening of switches 84 and 90 causes the current from the feedback capacitor 78 to be summed with the deviation current generated in differential error amplifier 40 at the junction 48. Since the input to current amplifier 70 from controller amplifier 50 following transfer to the automatic mode will differ from the pre-transfer input supplied by amplifier 68 by the amount proportional to the error voltage at the input of amplifier 50, the output of power amplifier 70 will change slightly as the feedback voltage compensates for this error voltage. As was the case in the automatic-to-manual transfer, the change in output of power amplifier 70 is negligible relative to the total output because of the high gain and low offset voltage of amplifier 50, making the manual to automatic transfer an effectively bumpless transfer.

While there has been described what is believed to be a preferred embodiment of the present invention, variations and modifications will occur to those skilled in the art once they become familiar with the invention. For example, the invention would operate equally well in single controller closed loop systems or in systems wherein control might be manually or automatically switched among multiple controllers having dissimilar outputs. That is, the invention might be used where the output selector circuitry disclosed herein is replaced by a simple manually controlled multi-position switch. Therefore, it is intended that the appended claims shall be construed to include all such variations and modifications as would occur to those skilled in the art.

I claim:

1. For controlling the magnitude of current supplied to a control element, a system comprising:
    a. a plurality of subsystems for alternatively controlling the current, each of said subsystems including
        an amplifier having a first input terminal, a second input terminal which is electrically connected to a system common terminal, and an output terminal, and
        a feedback capacitor having one terminal connected to said first input terminal;
    b. a system feedback path forming a feedback connection between the control element and each of said feedback capacitors;
    c. system switching means for simultaneously
        connecting the output terminal of the amplifier in one of said subsystems to the control element,
        connecting the first input terminal of each amplifier in the remaining subsystems to the common terminal whereby the feedback current charges each of said feedback capacitors in each of the remaining subsystems to a voltage directly proportional to the current through the control element, and
        disconnecting the first input terminal of the amplifier in said one subsystem from the common terminal.

2. For controlling the magnitude of current supplied to a control element, a system including:
    a. an automatic control subsystem comprising one or more process controllers, each of which includes
        an amplifier having a first input terminal for receiving a signal representative of a deviation between a predetermined characteristic for the process and a setpoint for that characteristic, a second input terminal connected to a system common terminal, and an output terminal, and
        a feedback capacitor having one terminal connected to said first input terminal;
    b. a manual control subsystem including
        an amplifier having a first input terminal, a second input terminal connected to the system common terminal, and an output terminal, and
        a feedback capacitor having one terminal connected to said first input terminal;

c. a system feedback path connected between the control element and the other terminal of each of said feedback capacitors; and d. system switching means for simultaneously connecting the output terminal of an amplifier in a first of said subsystems to the control element, connecting the first input terminal of each amplifier in the second of said subsystems to the system common terminal whereby each feedback capacitor in said second subsystem is charged to a voltage proportional to the current through the control element, and disconnecting the first input terminal of each amplifier in said first subsystem from the system common terminal.

3. A system as recited in claim 2 wherein said manual control subsystem further includes a voltage source comprising:

a positive voltage source;

a negative voltage source;

contact means for connecting a selected one of said sources to the first input terminal of the amplifier in said manual control subsystem to control the current supplied to the first input, said contact means having a normal non-connecting position from which it must be moved to effect the connection.

4. A system as recited in claim 2 wherein said system feedback path includes a high impedance amplifier having an input terminal connected in circuit with the control element and an output terminal connected electrically to each of said feedback capacitors in each of said subsystems.

5. A system as recited in claim 3 wherein said system feedback path includes a high impedance amplifier having an input terminal connected in circuit with the control element and an output terminal connected electrically to each of said feedback capacitors in each of said subsystems.

6. A system as recited in claim 2 wherein said automatic control subsystem includes output selector circuitry responsive to a predetermined characteristic of amplifier output to pass the amplifier output having the most extreme value of that characteristic while effectively open circuiting amplifiers having outputs of less extreme values.

7. A system as recited in claim 6 wherein said output selector circuitry includes a plurality of diodes, each having a first terminal connected to the output terminal of one of said amplifiers and a second terminal connected in common with the second terminals of the other diodes to the system switching means.

* * * * *